US012702925B2

(12) United States Patent
Holly et al.

(10) Patent No.: US 12,702,925 B2
(45) Date of Patent: Aug. 11, 2026

(54) MANAGING OF A USER-CREATED GAME OBJECT TO PROVIDE SECURE AND PREDICTABLE GAME PERFORMANCE

(71) Applicant: VRChat Inc., San Francisco, CA (US)

(72) Inventors: Kevin Holly, Ebergassing (AT); Jesse Joudrey, Port Coquitlam (CA); Jason Nuccio, San Francisco, CA (US); Euan Polson, Aberdeen (GB); Aaron McLean, Surrey (CA)

(73) Assignee: VRCHAT INC., San Francisco, CA (US)

( * ) Notice: Subject to any disclaimer, the term of this patent is extended or adjusted under 35 U.S.C. 154(b) by 352 days.

(21) Appl. No.: 18/509,416

(22) Filed: Nov. 15, 2023

(65) Prior Publication Data

US 2025/0153049 A1 May 15, 2025

(51) Int. Cl.

*A63F 13/63* (2014.01)
*A63F 13/35* (2014.01)
*A63F 13/70* (2014.01)

(52) U.S. Cl.

CPC .............. *A63F 13/63* (2014.09); *A63F 13/35* (2014.09); *A63F 13/70* (2014.09)

(58) Field of Classification Search

CPC .......... A63F 13/60; A63F 13/63; A63F 13/35; A63F 13/70; A63F 13/73; A63F 13/75
See application file for complete search history.

(56) References Cited

U.S. PATENT DOCUMENTS

2016/0021132 A1* 1/2016 Sheppard .............. H04L 67/306 726/23
2018/0330096 A1* 11/2018 Breindel ............... A63F 13/352
2020/0306639 A1* 10/2020 Karlsson ............... A63F 13/352
2021/0008455 A1* 1/2021 Bererton ................. A63F 13/71
2021/0174132 A1* 6/2021 Mayes ..................... A63F 13/35
2021/0374098 A1* 12/2021 Holmdahl ............. A63F 13/323
2022/0129064 A1* 4/2022 Gueye ................ G01C 21/3492
2022/0249957 A1* 8/2022 Kaufman ................ A63F 13/79
2023/0090253 A1* 3/2023 Meadows ............... H04L 67/12 345/419
2024/0082706 A1* 3/2024 Astley ................... A63F 13/352
2024/0390801 A1* 11/2024 Ignatchenko ........... A63F 13/69
2025/0153049 A1* 5/2025 Holly ...................... A63F 13/35

* cited by examiner

*Primary Examiner* — Chase E Leichliter
(74) *Attorney, Agent, or Firm* — Polsinelli PC

(57) ABSTRACT

The present technology receives raw assets of user-generated content at a platform server. The platform server can utilize techniques to recognize reused assets to avoid storing duplicate data. Additionally, the present technology can utilize a validation scheme by which portions of user content that include executable code are only permitted to be uploaded to the platform server when these portions of the user content are recognized and are already known to be safe. Additionally, the present technology can be configured to modify the raw assets of the content to be compatible with the latest updates to the platform and to the distribution platforms in which the user-generated content will be executed.

21 Claims, 8 Drawing Sheets

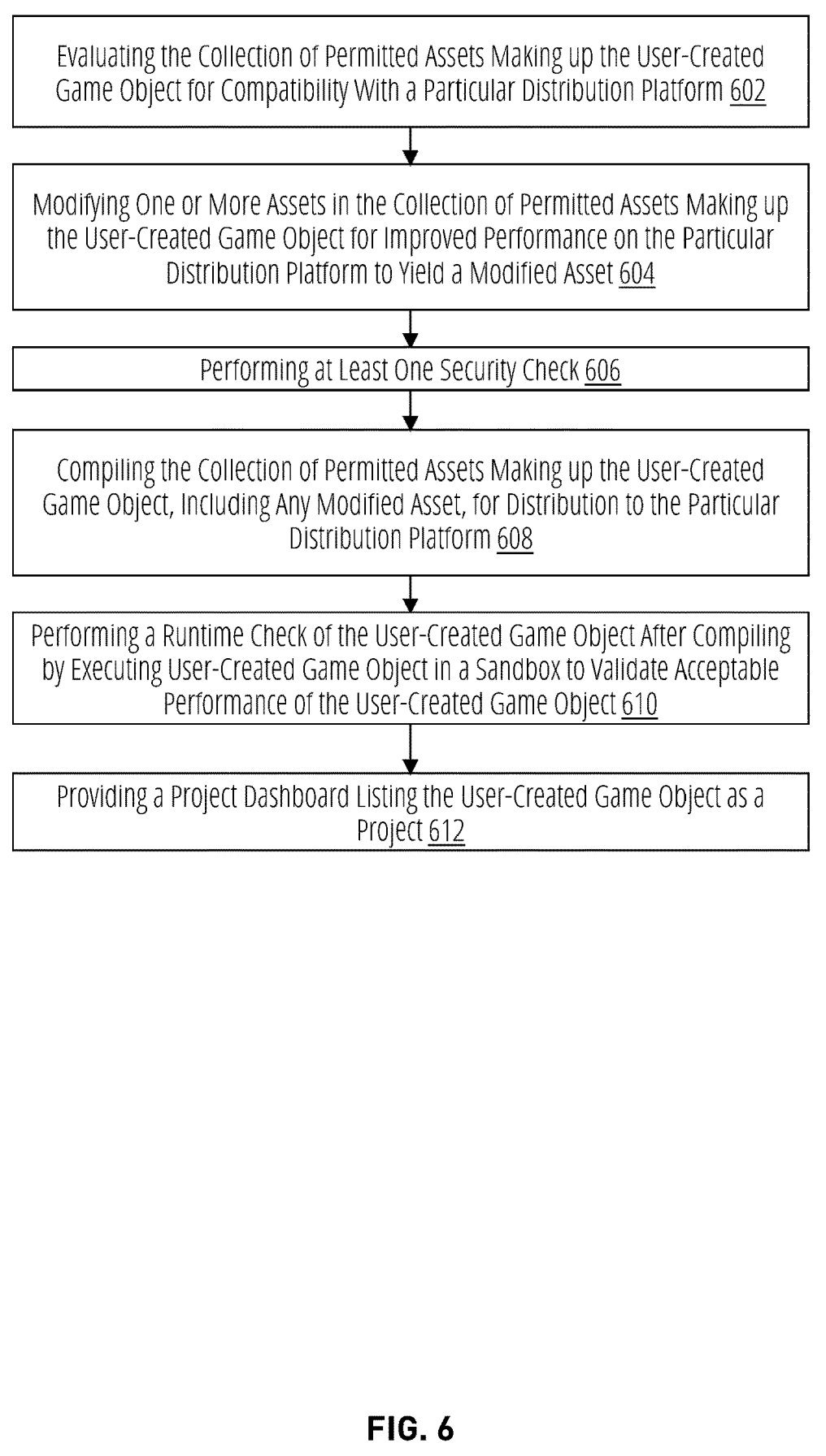

Evaluating the Collection of Permitted Assets Making up the User-Created Game Object for Compatibility With a Particular Distribution Platform 602

Modifying One or More Assets in the Collection of Permitted Assets Making up the User-Created Game Object for Improved Performance on the Particular Distribution Platform to Yield a Modified Asset 604

Performing at Least One Security Check 606

Compiling the Collection of Permitted Assets Making up the User-Created Game Object, Including Any Modified Asset, for Distribution to the Particular Distribution Platform 608

Performing a Runtime Check of the User-Created Game Object After Compiling by Executing User-Created Game Object in a Sandbox to Validate Acceptable Performance of the User-Created Game Object 610

Providing a Project Dashboard Listing the User-Created Game Object as a Project 612

FIG. 6

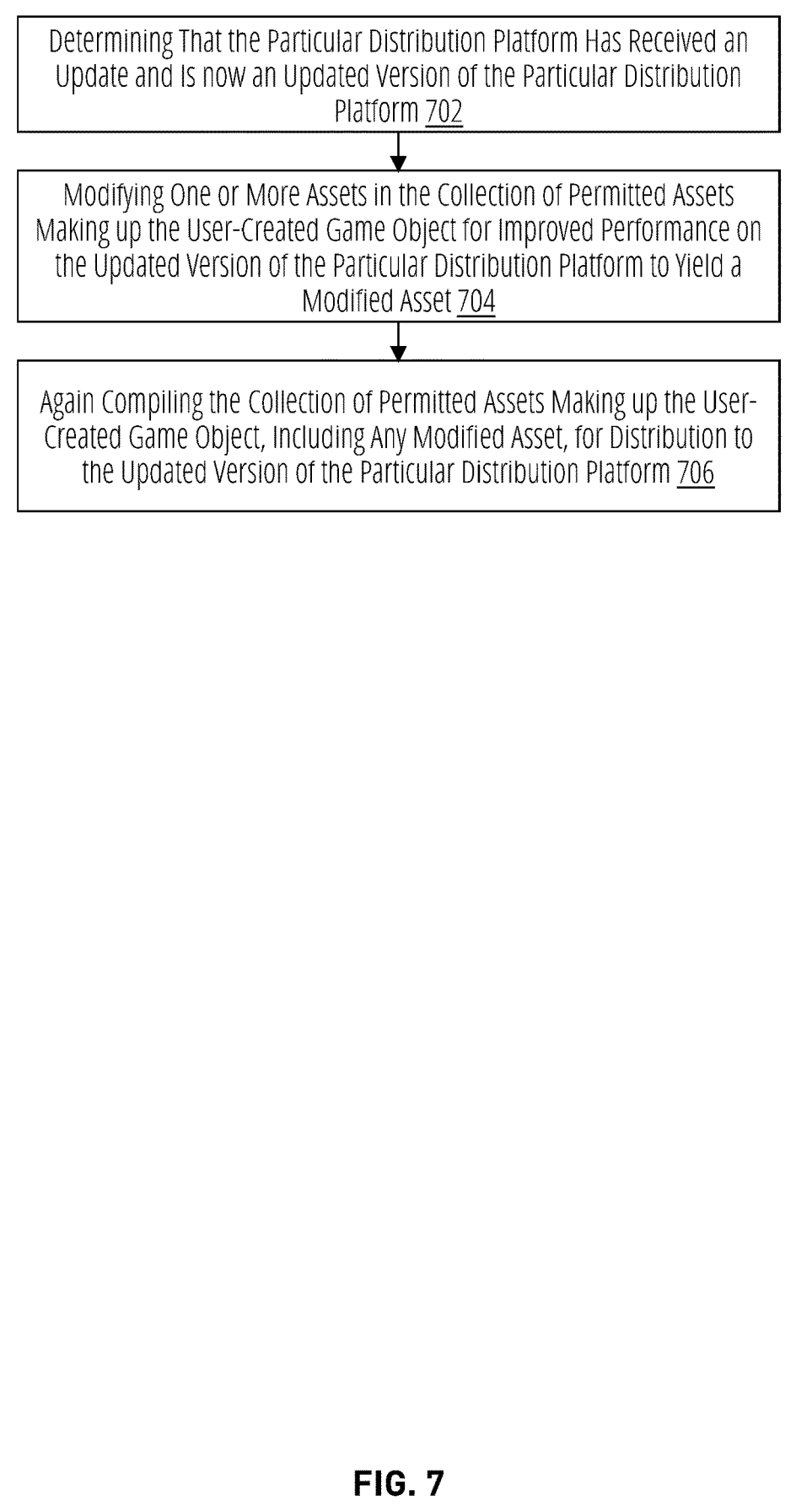

Determining That the Particular Distribution Platform Has Received an Update and Is now an Updated Version of the Particular Distribution Platform 702

Modifying One or More Assets in the Collection of Permitted Assets Making up the User-Created Game Object for Improved Performance on the Updated Version of the Particular Distribution Platform to Yield a Modified Asset 704

Again Compiling the Collection of Permitted Assets Making up the User-Created Game Object, Including Any Modified Asset, for Distribution to the Updated Version of the Particular Distribution Platform 706

FIG. 7

MANAGING OF A USER-CREATED GAME OBJECT TO PROVIDE SECURE AND PREDICTABLE GAME PERFORMANCE

BACKGROUND

Game object distribution platforms are important for developers to distribute their games, avatars, in-app objects, and other game-related software objects to users. Game object distribution platforms play a role in ensuring the quality, safety, and integrity of the gaming experience for users. By subjecting games, avatars, in-app objects, and other game objects to a validation process before making them available for download, game object distribution platforms safeguard the interests of both developers and users. An example type of game object distribution platform is an app store.

Game object distribution platforms prioritize quality assurance by implementing rigorous testing and evaluation procedures. Game submissions undergo thorough inspections for software bugs, performance issues, compatibility across devices and operating systems, and adherence to platform-specific guidelines. By vetting games for quality, game object distribution platforms strive to maintain high standards and deliver a seamless gaming experience to users.

Game object distribution platforms act as gatekeepers, protecting users from potentially harmful or fraudulent games, avatars, in-app objects, and other game objects. Rigorous review processes help identify and prevent the distribution of malicious software, including malware, viruses, and scams. By curating content, game object distribution platforms reduce the risk of data breaches, privacy violations, and financial loss through unauthorized purchases.

BRIEF DESCRIPTION OF THE SEVERAL VIEWS OF THE DRAWINGS

The present technology will be described with reference to the appended drawings. The drawings aid in the description of the present technology and are not to be considered to be limiting the scope of the appended claims. The accompanying drawings include:

FIG. 6 illustrates an example routine for providing services on the raw assets of collection of permitted assets making up the user-created game object in accordance with some aspects of the present technology.

FIG. 7 illustrates an example routine for updating a user-created game object to accommodate an updated distribution platform in accordance with some aspects of the present technology.

DETAILED DESCRIPTION

Figure 1:
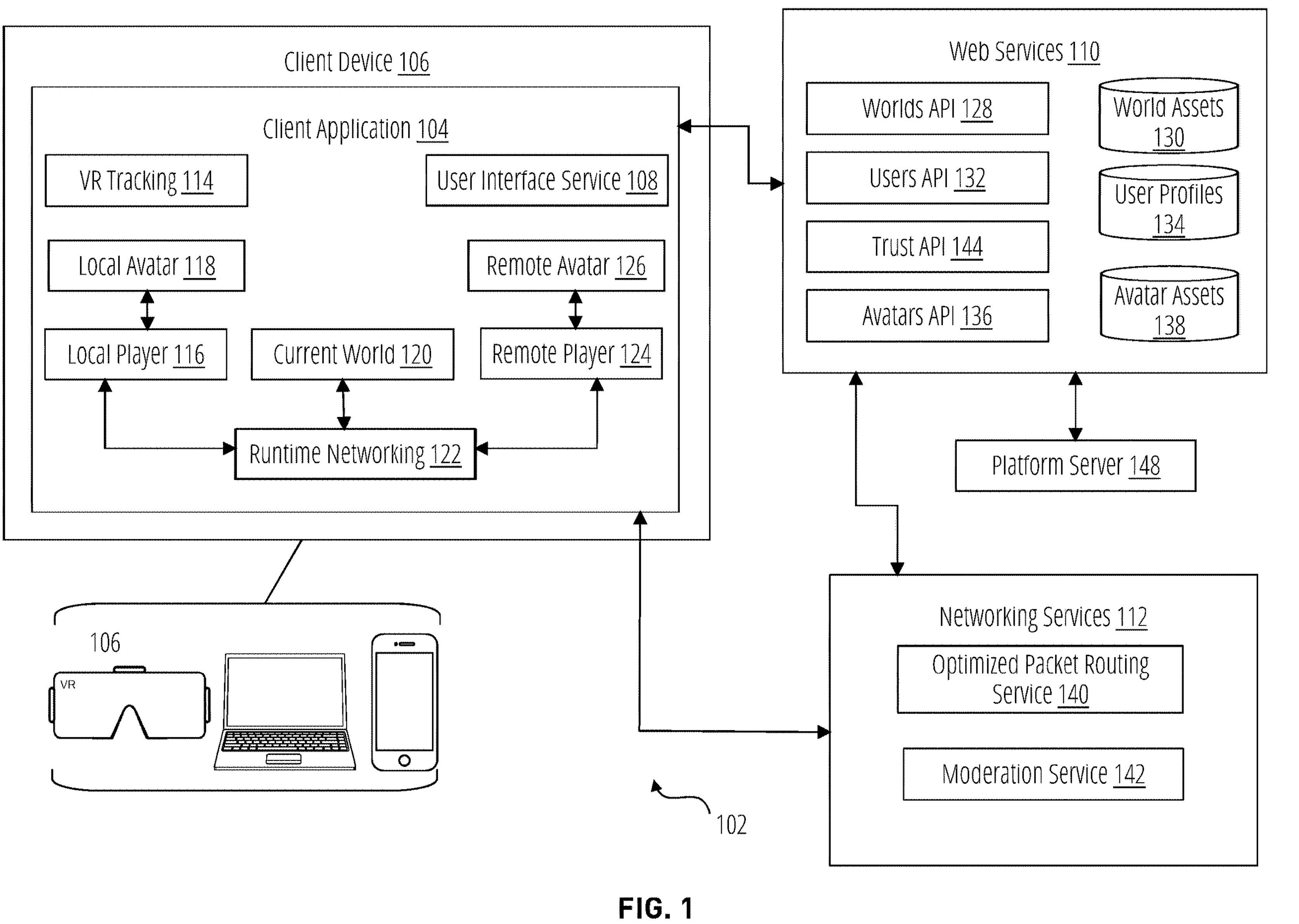
FIG. 1 illustrates an example virtual world platform for playing and hosting a multiplayer virtual reality (VR) experience in accordance with some aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Object distribution platforms distribute games, avatars, in-app objects, and other game-related software objects from developers and make it available for download. Object distribution platforms also validate such content. However, there is no equivalent distribution platform that is open to all users that may generate content.

In an environment in which users generate content, additional complexities exist. Developers are generally approved to generate content for distribution by game object distribution platforms, whereas, in a user-generated content environment, any user can upload content. Developers are more likely to follow platform rules, and have more to lose by being banned from uploading content to an object distribution platform. There are also less developers than users, which also means there is less content to be validated and hosted in the developer-oriented environment than in the user-oriented environment.

For example, one complexity common in environments in which users generate content is the sheer amount of content generated by users. Not only is there way more data to store, but it is not possible to perform more than automated validations on the user-generated content given the quantity of content.

Additionally, while professional developers typically try to respect the intent of rules meant to safeguard platforms, a greater number of users are likely to push the boundaries of what can be included in their content (whether intentionally or unintentionally through somewhat lesser skill levels). Therefore, the types of automated validations that might be performed in existing object distribution platforms might be vulnerable to permitting harmful or poorly performing content to reach other users' devices.

Another complexity that might be expected in an environment in which users generate content is that the level of skill in developing content by many users may be somewhat less than professional developers. This can lead to situations in which users fail to maintain their content as aspects of the object distribution platform evolve, or as the systems in which the user-generated content will eventually be executed are updated.

The present technology addresses these challenges.

As will be described herein one aspect of the present technology is that users can upload the raw assets of their user-generated content to a platform server. The platform server can utilize techniques to recognize reused assets to avoid storing duplicate data. In this way, the present technology can be equipped to deal with large amounts of user-generated data common in such an environment.

Additionally, the present technology can utilize a validation scheme by which portions of user generated content that include executable code are only permitted to be uploaded to the platform server when these portions of the user content are recognized and are already known to be safe. Moreover, rather than allow users to upload their own versions of the executable code, the present technology can instead utilize versions of the executable code from a trusted source.

Additionally, the present technology can be configured to modify raw assets of the content to be compatible with the latest updates to the platform and to the distribution platforms in which the user-generated content will be executed.

Accordingly, the present technology addresses these shortcomings in the prior art as well as provides other benefits which will be readily apparent from the description provided herein.

FIG. 1 illustrates an example virtual world platform 102 for playing and hosting a multiplayer virtual reality (VR) experience that is suited to carrying out the present technology. Although the example system depicts particular system components or services and an arrangement of such components and services, this depiction is to facilitate a discussion of the present technology and should not be considered limiting unless specified in the appended claims.

The virtual world platform 102 can connect client applications 104 through web services 110 and networking services 112 to socially interact together in a virtual world hosted by virtual world platform 102.

The virtual world platform 102 primarily includes a client application 104, which is an instance of an application executed on a client device 106. The client application 104 interacts over a network connection with web services 110 which supports client application 104 by providing various services through one or more application programming interfaces (APIs). A few of the main services provided by web services 110 are related to supporting virtual worlds through the worlds API 128, user profiles through the users API 132, trust and safety through the trust API 144, and complex avatars through avatars API 136. Web services 110 generally stores and provides long-term state information among other functions.

The client application 104 also interacts with networking services 112, which provides communication services between client application 104, networking services 112, and a remote instance of client application 104 (not shown) to share state information among respective instances of client application 104. In particular, state information is received from a plurality of instances of client application 104 by networking services 112 as each instance of client application 104 controls its local player 116. Networking services 112 can transfer state information about respective players to other instances of client application 104 when the local players 116 for the respective client instances are all engaged in gameplay in the same virtual world. The networking services 112 provide optimized packet routing through optimized packet routing service 140 and moderation between one or more clients through moderation service 142.

The client application 104 is the runtime environment executing on a particular client device 106. While the present description sometimes refers to client application 104, local client, and remote clients, all are instances of the client application 104 executing on a respective client device 106. One particular user account is logged into a particular instance of client application 104. A local client and remote client are distinguished to illustrate how client application 104 handles first person inputs from a user of the client device 106 upon which client application 104 is executing and handles third party inputs received from another user operating their client device upon which the remote client is executing.

Client device 106 can be any computing device. While client application 104 is particularly adapted to providing an immersive virtual reality experience through interactions that require a VR headset to experience, client application 104 can also be run by computers and mobile devices. Some virtual worlds or complex avatars might not be configured to perform well on certain device types, and therefore, while client application 104 can operate on many platforms and devices, not all virtual worlds or complex avatars will be available or have full functionality on all client devices 106.

User interface service 108 is one service that is part of client application 104. User interface service 108 is configured to provide various user interface elements such as menus that display various user settings, available worlds, saved complex avatars, friends lists, etc. User interface service 108 can populate its menus through interaction with one or more APIs provided by web services 110, while other portions of menus are loaded directly from user interface service 108.

User interface service 108 can provide a menu of available worlds by calling worlds API 128 to retrieve a list of worlds to which the user account logged into client application 104 is permitted to enter. Worlds API 128 can retrieve all public worlds from the world assets database 130 and send a list of those to client application 104. Additionally, worlds API 128 can request world IDs for any private worlds associated with the user account logged into client application 104 and retrieve the private worlds from the world assets database 130 to send to client application 104. User interface service 108 can receive user inputs through a hardware interface to navigate through the worlds menu and to receive a selection of a world to visit.

Another user interface provided by user interface service 108 pertains to various user settings. Such settings can pertain to whether the human player is sitting or standing, settings to minimize motion sickness in players that are susceptible to motion sickness when playing in VR, settings to select a complex avatar, settings about how a player might be viewed and by whom a player might be viewed in a virtual world.

One notable user interface provided by the user interface service 108 is the trust and safety menu. User interface service 108 can contact users API 132 to retrieve current trust and safety settings from user profiles database 134 and display these settings in the trust and safety menu. The trust and safety menu provides the user account with the ability to determine which remote players 124 can see the user's avatar (local player 116) or be seen by the user's avatar when they are both in the same world. For example, it may be desirable to avoid interacting with newer users of the virtual world platform 102 since they have not built up trust within the virtual world platform 102. It may also be desirable to limit the features of a remote player's avatar that will be processed by the instance of client application 104 to which the local user is logged in. This is because some avatars may have malicious data embedded, or the avatars may be too complex to render without degrading the performance of client device 106. For example, a user account might decide to turn off lights on remote avatars to avoid shaders, disallow custom animations, etc. In some embodiments, each of these options might be set based on how trusted the remote player is. For example, a user account might allow their friend's avatars to have full features, while others only display basic avatar features.

The user interface service 108 can also provide options to mute or block specific remote players. Additionally, the user interface service 108 can provide a panic mode to audio-and-visually mute anybody who is not a friend.

After a user has selected a virtual world from the menu provided by the user interface service 108, client application 104 can download an instance of the virtual world by calling the worlds API 128, which can retrieve the virtual world from worlds world assets database 130 and send it to client application 104 for execution.

The world assets are large binary files built for a game engine, such as UNITY using an editor with a software development kit (SDK) provided for use with the virtual world platform 102. If a user travels into a world, they need to download that world asset from world assets database 130. If there are already people in that instance of the world, client application 104 also needs a list of the avatars of those people so that the avatars can be rendered in the instance of the virtual world.

In some embodiments, a function of the worlds API 128 can confirm that the user account can access the requested world. While the user account should only have the ability to view public worlds in the user interface menu or should only have knowledge of links to worlds that have been shared with the user account, the worlds API 128 can confirm the user account is permitted to access the virtual world as a redundancy measure.

In addition to downloading the instance of the virtual world, the client application 104 can also establish a session with networking services 112 for the specific instance of the world. Networking services 112 can provide information about the current state of the instance of the virtual world. For example, networking services 112 can provide a list of remote avatars 126 present in the virtual world instance to client application 104. In turn, client application 104 can contact the avatars API 136 to download complex avatar assets for the list of remote complex avatars from avatar assets database 138.

If the client application 104 does not have assets for the local avatar 118, client application 104 can also contact the avatars API 136 to request and receive the local avatar assets. Avatar assets are a single binary file that contains all of the textures and models and animation data needed to render the avatar. In some instances, more complicated features can be included such as data about particle systems or light sources, or if the avatar should obey or defy laws of physics established in a virtual world, or if the avatar has non-standard movement dynamics.

The downloaded instance of the virtual world can be executed by client application 104 as current world 120. Current world 120 can include coordinates within the current world 120 where the local player 116 and each remote player 124 are located. The local player 116 and remote player 124 are each collision volumes of space that the respective local player 116 or remote player 124 occupy.

The local avatar 118 can be mapped to the local player 116, and the respective remote avatar 126 can be mapped to their respective remote player 124, thereby allowing each player to appear as their avatar in the current world 120. Movements of the remote avatars 126 are handled by receiving state data about a respective remote avatar/player and rendering the movement or audio by client application 104.

The VR tracking service 114 pertains to client applications 104 operating on a client device 106 that have access to VR tracking peripherals. For example, some VR headsets have cameras (integrated or external) to track the limbs of players. Many VR headsets can pair with controllers that can report the locations of a user's hands in space. Some client devices 106 include other peripherals configured to perform full skeleton tracking. VR tracking service 114 can fuse all VR inputs connected to the client.

The VR tracking service 114 can map the fused VR inputs to the local player 116 to allow the local player 116 to interact in and with the current world 120. Meanwhile, the local player 116 can interact with the local avatar 118 to map the local avatar 118 to the local player and make the local player 116 appear as their avatar.

In some embodiments, there is diversity in what parts of a user's body are tracked by VR tracking service 114. While some users might have full skeleton tracking, many users may only have the ability to perform hand tracking. To accommodate this disparity in hardware abilities of possible client devices 106, local player 116 can derive portions of a skeleton that are not tracked by VR tracking service 114. For example, if VR tracking service 114 only provides information about hand tracking for a user, the local player can still derive a full skeleton for the user and make portions of the skeleton move to accommodate the movement of the hands. In this way, an avatar's hands are not moving in a way that is disembodied from the rest of the avatar.

The local player 116 is the entity that moves around the environment in the current world 120. It can pick things up and put them down. It does not have any animation and is a collision volume. It can do everything in the world, but it has no appearance and does not need to animate.

The local player is further connected to the networking layer, illustrated as the runtime networking service 122, to broadcast state information about the local player 116 over the network to other users in the current world 120 instance.

The local player 116 and the remote player 124 are similar in that they are collision volumes that move around the environment in the current world 120. The main difference is that the local player 116 is controlled by client application 104, and the user of client application 104 is authoring the experience. In contrast, the remote player 124 is a playback mechanism representing actions being broadcast to the client application 104 representing other players present in the current world 120.

As addressed above, the local avatar 118 is overlaid with the local player 116 to give the user a visual appearance. Actions by the local player 116 are animated as the local player interacts with the current world. For example, while the local player 116 can interact to pick up an object in the current world 120, without the local avatar 118, the object would appear to float in the air. With the local avatar 118 overlaid the local player 116, the object now appears to be held by the hand of the avatar.

The remote player 124 and remote avatar 126 work similarly to their local counterparts except for where the inputs that control the remote player 124 come from. The remote player 124 and remote avatar 126 are playback devices for state information received by the runtime networking service 122 from networking services 112. While FIG. 1 only depicts one remote player 124 and remote avatar 126, there can be many.

The current world 120 also has features that require networking. The current world 120 could have objects, like scissors or a light switch, that a user can pick up, and the object needs to broadcast its state across the network so that other users in the current world 120 can view the current state of the object.

Each of the local player 116, current world 120, and remote player 124 are connected to the runtime networking service 122. The local player 116 primarily transmits updated state information for the local player 116 to remote instances of client application 104 that are also executing the same virtual world. The current world 120 can transmit and receive state information about the instance of the virtual world. The current world executing on client application 104 transmits state information when the state change is owned by the local player 116 and receives state information when the state change is owned by the remote player 124.

Networking services 112 are the network-side part of the networking layer of the virtual world platform 102. In some embodiments, portions of the networking services 112 are provided by a networking plug-in such as the PHOTON networking engine, which broadcasts state information to all users in an instance of a virtual world.

In addition to the general broadcasting of state information to all users interacting with an instance of a virtual world, the optimized packet routing service 140 provides more advanced features that provide an enhanced user experience and enforces other virtual world platform 102 properties, such as trust and safety configurations.

For example, to provide an enhanced user experience, the optimized packet routing service 140 can filter out voice packets coming from a remote player 124 that might be far from the local player 116 in the instance of the current world 120. Without such optimization, remote players 124 that are not interacting or even visible to the local player might receive audio packets from tens or even hundreds of remote players 124 that would make it hard to communicate with any subsets of remote players 124.

In another example, the optimized packet routing service 140 can enforce trust and safety configurations. As addressed above, trust and safety configurations can specify specific user accounts or groups of user accounts to be filtered so that they cannot interact with the local player 116 or have limited interactions with the local player 116. The optimized packet routing service 140 can call trust API 144 to learn of a list of remote players 124 that might need to be subject to some level of filtering or blocking of network traffic going to or coming from the client application 104 for the local player 116 having the trust and safety configurations.

The trust API 144 can determine which remote players 124 should be blocked for the local player 116 or which remote players 124 should have aspects of their complex avatar limited. Some of these determinations are based on logic and rules that categorize remote players 124 based on quantities and types of past interactions with the virtual worlds platform 102. Trust API 144 may make these determinations by using settings stored in the user profile of the local player 116 and comparing these settings to data stored in user profiles of remote players 124.

Another of the networking services 112 is a moderation service 142 that can provide conflict resolutions and access control. For example, before a user accesses a world, especially a private world, moderation service 142 can call the worlds API 128 to ensure the user can enter the world. In another example, there can be instances where two different users attempt to claim control of an object in a virtual world at approximately the same time. The moderation service 142 can handle those sorts of conflicts by selecting a particular user to control an object until they relinquish the control of the object, which allows another user to claim control of the object. A user that has control of the object can broadcast packets informing remote players 124 of the state of that object.

In some embodiments, client application 104, virtual worlds, and complex avatars can be configured to operate in a particular game engine, especially a game engine that supports three-dimensional (3D) environments. Two common game engines include UNITY and UNREAL ENGINE.

In some embodiments, to be supported by virtual world platform 102, virtual worlds and complex avatars need to be developed in compliance with a software development kit (SDK). For example, complex avatars require a particular script to be usable in the virtual world platform 102. In another example, there can be a number of requirements that need to be followed to get the animations of an avatar to play. In some embodiments, the SDK can define other necessary details to support particular client devices. For example, the SDK can define specific shaders to be used if the avatar is to be used on the OCULUS QUEST VR headset.

In some embodiments, the SDK requires virtual worlds to utilize a particular coding language to ensure the world has compliant behaviors. For example, the SDK can require that behaviors in worlds are defined using UDON, a programming language specific to a particular virtual world platform 102, VRCHAT. In some embodiments, the programming language facilitates a world built using the programming language to comply with file access safeguards provided by the virtual world platform 102. For example, a world cannot read or write anything to a hard drive, and only approved web pages can be rendered in a world on the virtual world platform 102.

In some embodiments virtual world platform 102 can also include a platform server 148 for validating and compiling user created content prior to storing the compiled content in world assets database 130 or avatar assets database 138.

While the virtual world platform 102 is suited to carrying out the present technology, persons of ordinary skill in the art will appreciate that the present technology can be used in other environments.

Figure 2:
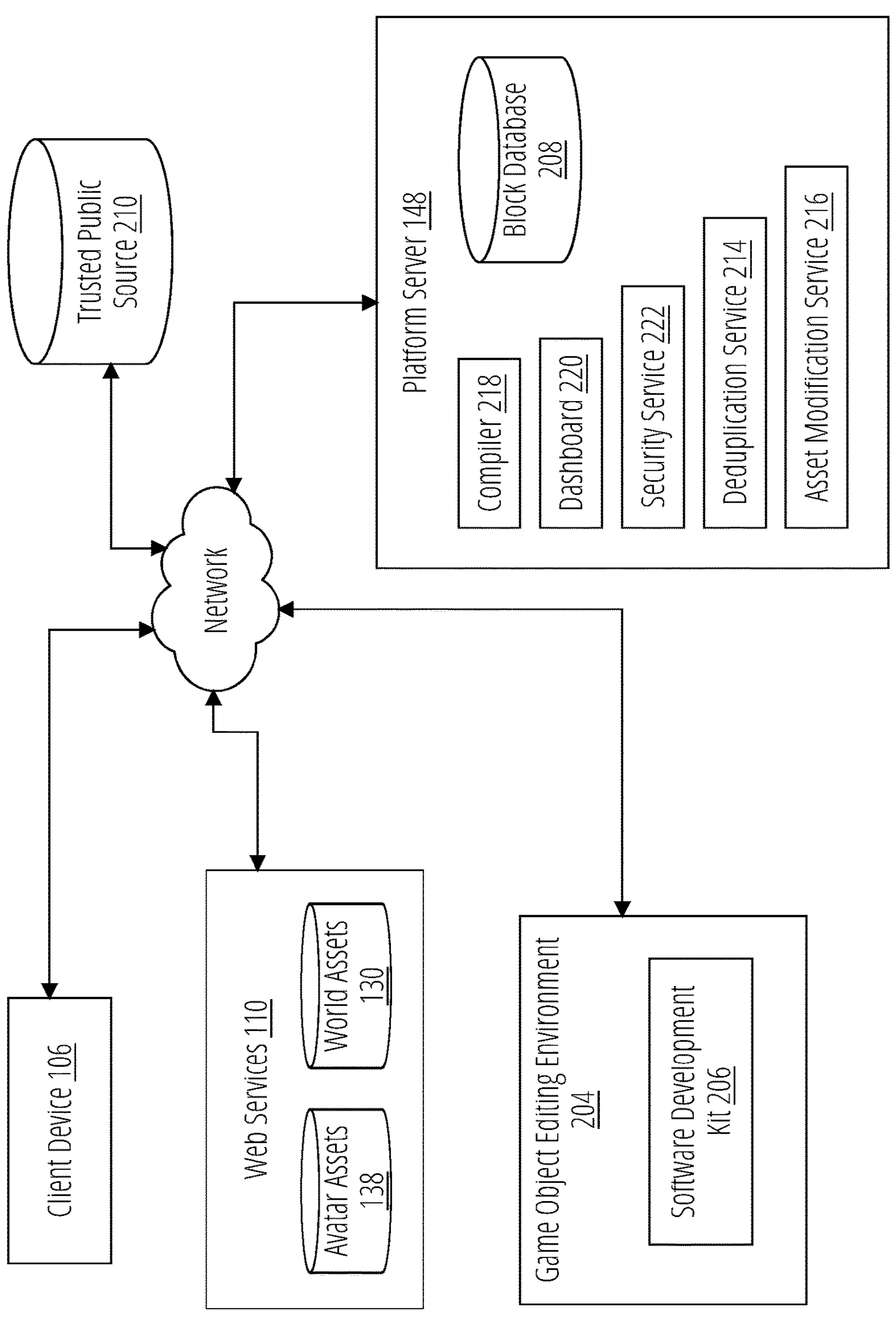
FIG. 2 illustrates an example system for managing user-created game objects to provide a secure and predictable game performance on a client device in accordance with some aspects of the present technology.

FIG. 2 illustrates an example system for managing user-created game objects to provide a secure and predictable game performance on a client device in accordance with some aspects of the present technology. Although the example system depicts particular system components or services and an arrangement of such components and services, this depiction is to facilitate a discussion of the present technology and should not be considered limiting unless specified in the appended claims.

Users can create user-created game objects using the game object editing environment 204. In some embodiments, the game object editing environment 204 can operate on a client device, which could be client device 106, but as illustrated in FIG. 1 and FIG. 2 client device 106 is provided primarily to illustrate a player's client device 106 running client application 104.

The game object editing environment 204 can be a software development platform for developing software, and especially games, virtual worlds, avatars, etc. Some examples of well-known game object editing environments include UNITY and UNREAL. Game object editing environments 204 can include a software development kit 206 that is provided by the platform server 148. The software development kit 206 can include a variety of assets that are approved for use by users creating user-created game objects as well as tools to aid in the creation of the user-created game objects. Additionally, the software development kit 206 can provide a collection of policies for attributes of acceptable user-created game objects. The software development kit 206 can also include software for performing checks and analysis on the user-created game objects before they are uploaded to platform server 148.

Accordingly, users can create their user-created game objects in the game object editing environment 204 using the functions of the game object editing environment 204 along with the installed software development kit 206. As will be described herein the software development kit 206 includes a variety of functions for performing checks and analysis on the user-created game objects.

One function of the software development kit 206 is to determine whether any assets in the user-created game objects are a duplicate of assets already stored at the block database 208 of platform server 148. Accordingly, the software development kit 206 can work in collaboration with the deduplication service 214 on platform server 148 to identify assets that already exist at the block database 208. As will be described herein, any assets that are duplicates do not need to be uploaded to the platform server 148, but unique assets can be stored in block database 208.

Game assets can be uploaded to the platform server 148 and stored in chunks in the block database 208. In some cases, portions of the user-created game objects include trusted game assets from public sources, such as trusted public source 210. In some embodiments, such trusted game assets from public sources do not need to be downloaded for storage in block database 208 and instead can be referenced and accessed from the trusted public source 210 on demand.

In some embodiments, platform server 148 can identify one or more assets of the user-created game objects as needing modifications. In one example, an asset may need modifications in order to work with an updated version of a platform or a distribution platform. In the context of the present technology, the platform is an environment for the creation and distribution of user-created game objects, and an application in which to interact with these user-created game objects. One example of such an environment is the VRCHAT, INC . . . platform in which users can create worlds and avatars for distribution by the web services 110 and for players to interact with these user-created game objects using client application 104 on client device 106.

An example of a distribution platform includes different client devices 106 and their operating systems. For example, some common client devices include personal computers, running the STEAM gaming platform, virtual reality headsets, such as the OCULUS family of devices by META, the VISION PRO by APPLE INC., the VIVE family of headsets by HTC, etc., and even mobile devices such as iOS devices by APPLE, and ANDRIOD devices by a variety of manufactures. All of these distribution platforms can be updated over time, and accordingly, the asset modification service 216 can keep the assets of the user-created game objects up-to-date for distribution.

The user-created game objects need to be compiled for every distribution platform. Accordingly, compiler 218 of the platform server 148 can be used to compile different versions of the user-created game objects for distribution to the supported distribution platforms.

The platform server 148 can also perform a variety of security services using security service 222. For example, the security service 222 can evaluate the compiled user-created game objects by loading these user-created game objects in a sandboxed environment to ensure that the compiled user-created game objects are safe to run on the supported distribution platforms.

Once a user-created game object is ready for distribution, platform server 148 can save the compiled user-created game object, such as an avatar or a world in the world assets database 130 or avatar assets database 138 so that the client application 104 can access these assets as described in FIG. 1 above.

The platform server 148 can also include a dashboard 220 that can be used to display information about user-created game objects, and the status of the user-created game objects as reported by platform server 148. For example, the dashboard 220 can be used to inform creators of user-created game objects of security concerns with some assets of a user-created game object, or inform a user of different platforms in which the user-created game object has been compiled, and is ready for distribution on those platforms.

Figure 3:
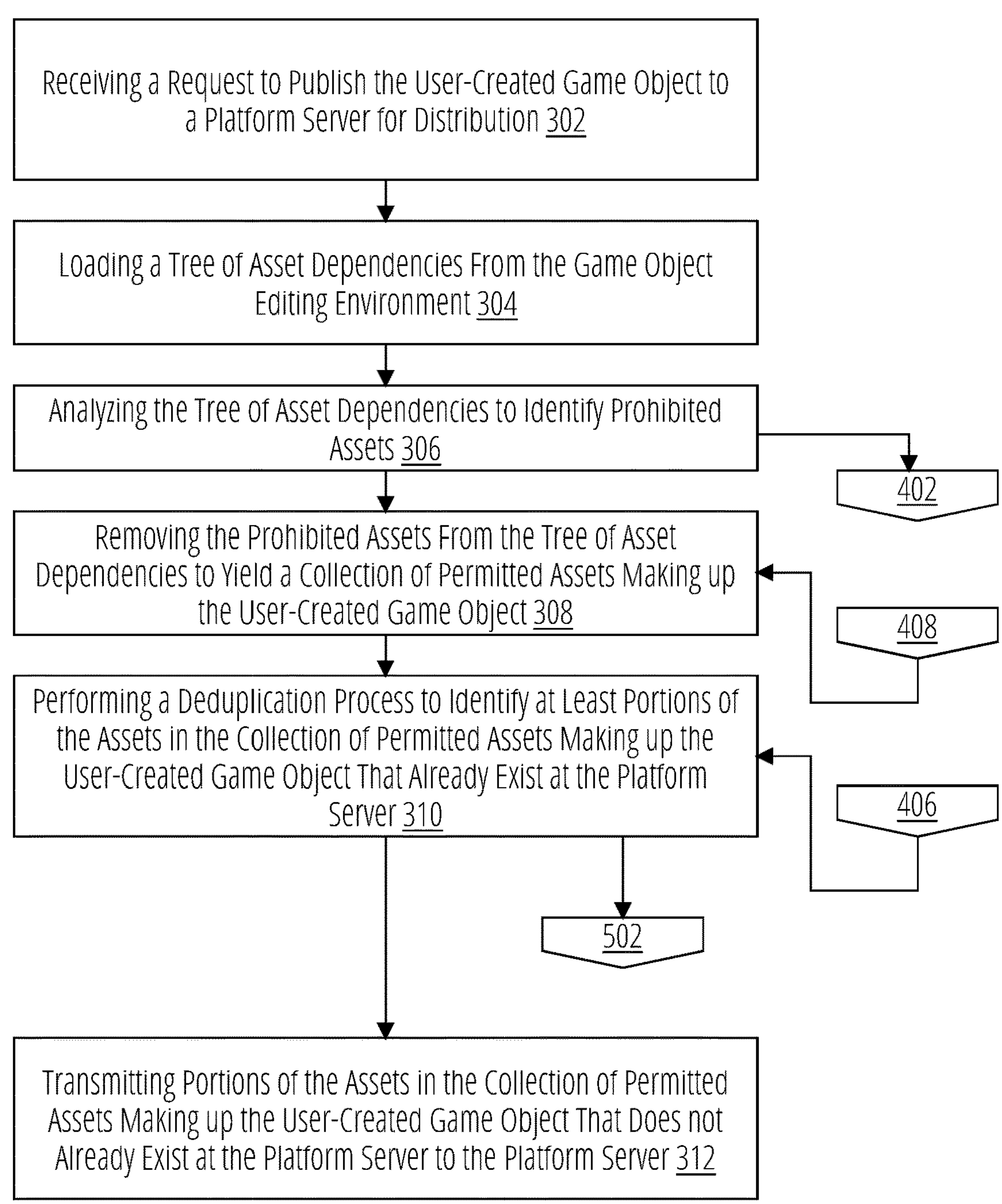
FIG. 3 illustrates an example routine for evaluating a tree of asset dependencies of raw assets of a user-created game object to identify prohibited assets and duplicated assets prior to uploading the collection of permitted assets making up the user-created game object to the platform server in accordance with some aspects of the present technology.

FIG. 3 illustrates an example routine for evaluating a tree of asset dependencies of raw assets of a user-created game object to identify prohibited assets and duplicated assets prior to uploading the collection of permitted assets making up the user-created game object to the platform server in accordance with some aspects of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

The virtual world platform 102 can be configured to receive, distribute, and render game objects, and especially user-created game objects. As addressed with respect to FIG. 2 users or developers can develop game objects using the game object editing environment that includes software development kit 206. The software development kit 206 can be a set of tools, libraries, documentation, and code samples provided by the virtual world platform 102 to assist developers (especially users of the virtual world platform 102) in building user-created game objects for the virtual world platform 102. The software development kit 206 can provide tools for building, testing, and debugging applications, as well as libraries for accessing various features and functionalities.

According to some examples, the method includes receiving, by a software development kit installed in a game object editing environment, a request to publish the user-created game object to a platform server for distribution at block 302. For example, the game object editing environment 204 illustrated in FIG. 2 may receive, by the software development kit 206 installed in the game object editing environment 204, a request to publish the user-created game object to a platform server for distribution. This can occur at the conclusion of a user finishing a version of a user-created game object, where the user wants to upload the version of the user-created game object to the platform server 148 to make the user-created game object available for use in the virtual world platform 102. In some examples, the user-created game object can be a virtual world or an avatar.

As is described herein, the present technology provides a system by which the raw assets of a user-created game object can be uploaded to the platform server 148. While providing the raw assets can enable the platform server 148 to provide certain advantages to the user that created the game objects and to the virtual world platform 102, the storage and maintenance of the raw assets also comes with challenges. A few of those challenges include the need to store a large amount of data, and that some of the assets might not be well configured for use in the virtual world platform 102 or worse, might intentionally or inadvertently introduce vulnerabilities into aspects of the virtual world platform 102. Accordingly, the routine in FIG. 3 can provide mechanisms for addressing at least these challenges, among others.

According to some examples, the method includes requesting a tree of asset dependencies from the game object editing environment at block 304. For example, the software development kit 206 illustrated in FIG. 2 may request/load a tree of asset dependencies from the game object editing environment 204. The tree of asset dependencies includes at least one asset and data descriptive of an appearance of the asset, a function of the asset, and/or a relationship of the asset to other assets making up the user-created game object. The tree of asset dependencies includes at least one shape model, texture, shader, animation, audio asset, particle system, or script.

In a 3D game environment such as provided by virtual world platform 102, various assets are used to create an immersive and engaging experience for players. Some commonly used assets include shape models that are digital representations of a virtual world along with objects, within the virtual world, and shape models for avatars. Another type of asset can includes textures that are applied to shape models to provide visual details and make them look realistic. They consist of images that define the surface appearance, such as color, patterns, roughness, and transparency. The assets can include shaders that determine how the surfaces of the shape models reflect light and interact with the game environment. The assets can include animations that can bring characters and objects made of the shape models to life by providing movement and action. The assets can include audio such as sound effects, background music, and voiceovers. The assets can include particle systems to simulate various visual effects like fire, smoke, explosions, or magic spells. The assets can also include scripts and other code that define the logic and behavior of game objects, as well as enable interaction with the player.

According to some examples, the method includes analyzing the tree of asset dependencies to identify prohibited assets at block 306. For example, the game object editing environment 204 illustrated in FIG. 2 may analyze the tree of asset dependencies to identify prohibited assets. The prohibited assets can be defined by the software development kit 206 and can cover any type of asset or class of content.

Figure 4:
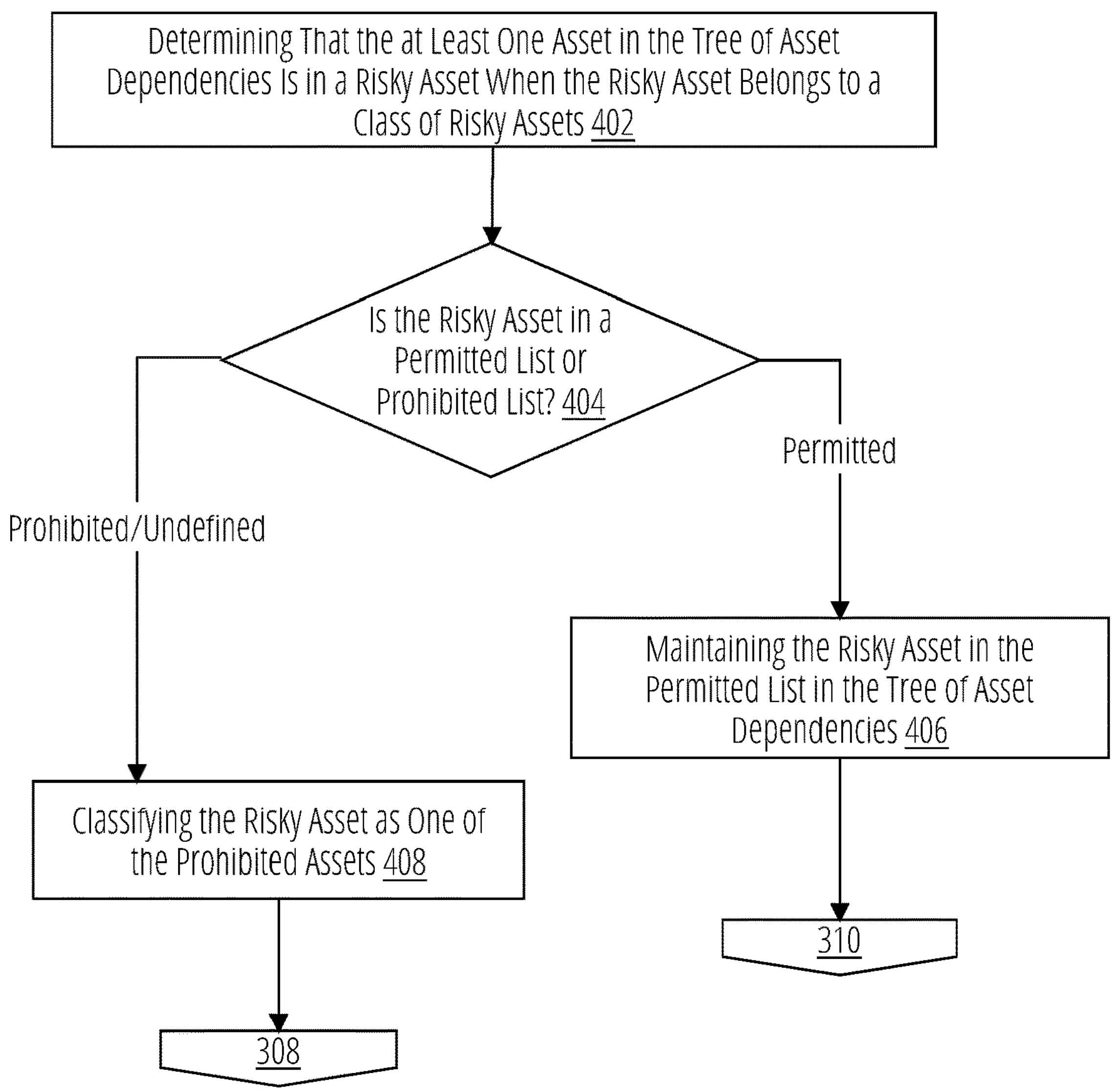
FIG. 4 illustrates an example routine for identifying classes of risky assets and identifying prohibited assets in accordance with some aspects of the present technology.

FIG. 4 illustrates an example routine for identifying classes of risky assets and identifying prohibited assets in accordance with some aspects of the present technology.

According to some examples, the method includes determining that the at least one asset in the tree of asset dependencies is a risky asset when the risky asset belongs to a class of risky assets at block 402. For example, the game object editing environment 204 illustrated in FIG. 2 may determine that the at least one asset in the tree of asset dependencies is a risky asset when the risky asset belongs to a class of risky assets. In one example, classes of risky assets can include an unauthorized script or code.

According to some examples, the method includes determining whether the risky asset is in a permitted list or prohibited list at decision block 404. The software development kit might include a list of known prohibited scripts and a list of known permitted scripts for example. A script that is not prohibited but also not in the permitted list might be subject to additional inspection before it can be allowed.

According to some examples, when it is determined that the risky asset is in the permitted list the method includes maintaining the risky asset in the tree of asset dependencies at block 406. For example, the game object editing environment 204 illustrated in FIG. 2 will leave the risky class asset in the tree of asset dependencies and proceed to block 310.

However, according to some examples, when it is determined that the risky class of asset is a prohibited asset, or at least an asset not in the permitted list, the method includes classifying the asset in the risky class of assets as one of the prohibited assets at block 408. For example, the game object editing environment 204 illustrated in FIG. 2 may classify the risky asset as one of the prohibited assets and proceed to block 308.

According to some examples, the method includes removing the prohibited assets from the tree of asset dependencies to yield a collection of permitted assets making up the user-created game object at block 308. For example, the game object editing environment 204 illustrated in FIG. 2 may remove the prohibited assets (or otherwise not permitted assets) from the tree of asset dependencies.

In some embodiments, the software development kit can also trigger a notification to the user informing them of the content that is being removed from their user-created game object. Such a notification might be displayed in the game object editing environment 204 or might be displayed in a web-based dashboard 220. In most cases, the content that is being removed is done for the security of the virtual world platform 102 and the client devices 106. The content that is removed from the tree of asset dependencies are often unknown scripts or known harmful scripts or other code.

The described technique regarding risky classes of assets has at least two advantages. First, the risky classes of assets can harm the virtual world platform 102 or client devices 106 and can cause poor performance of servers and client devices in the virtual world platform 102 so it makes sense to disallow code that is known to be harmful or poorly optimized. But it is also beneficial to only allow code that is known to be permitted because this code has already been tested and can be endorsed by the software development kit, and therefore, it will not need to undergo time-consuming and resource-intensive validation. Second, only allowing known and permitted assets from the risky class of assets, can also result in a storage space optimization. The storage space optimization can come from using a known version of the asset that is already stored at the platform server 148 or trusted public source 210. There is no need to store a known asset in duplicate as will be address in greater detail herein.

According to some examples, the method includes performing a deduplication process to identify at least portions of the assets in the collection of permitted assets making up the user-created game object that already exist at the platform server at block 310. For example, the game object editing environment 204 illustrated in FIG. 2 may perform a deduplication process to identify at least portions of the assets in the collection of permitted assets making up the user-created game object that already exist at the platform server.

Figure 5:
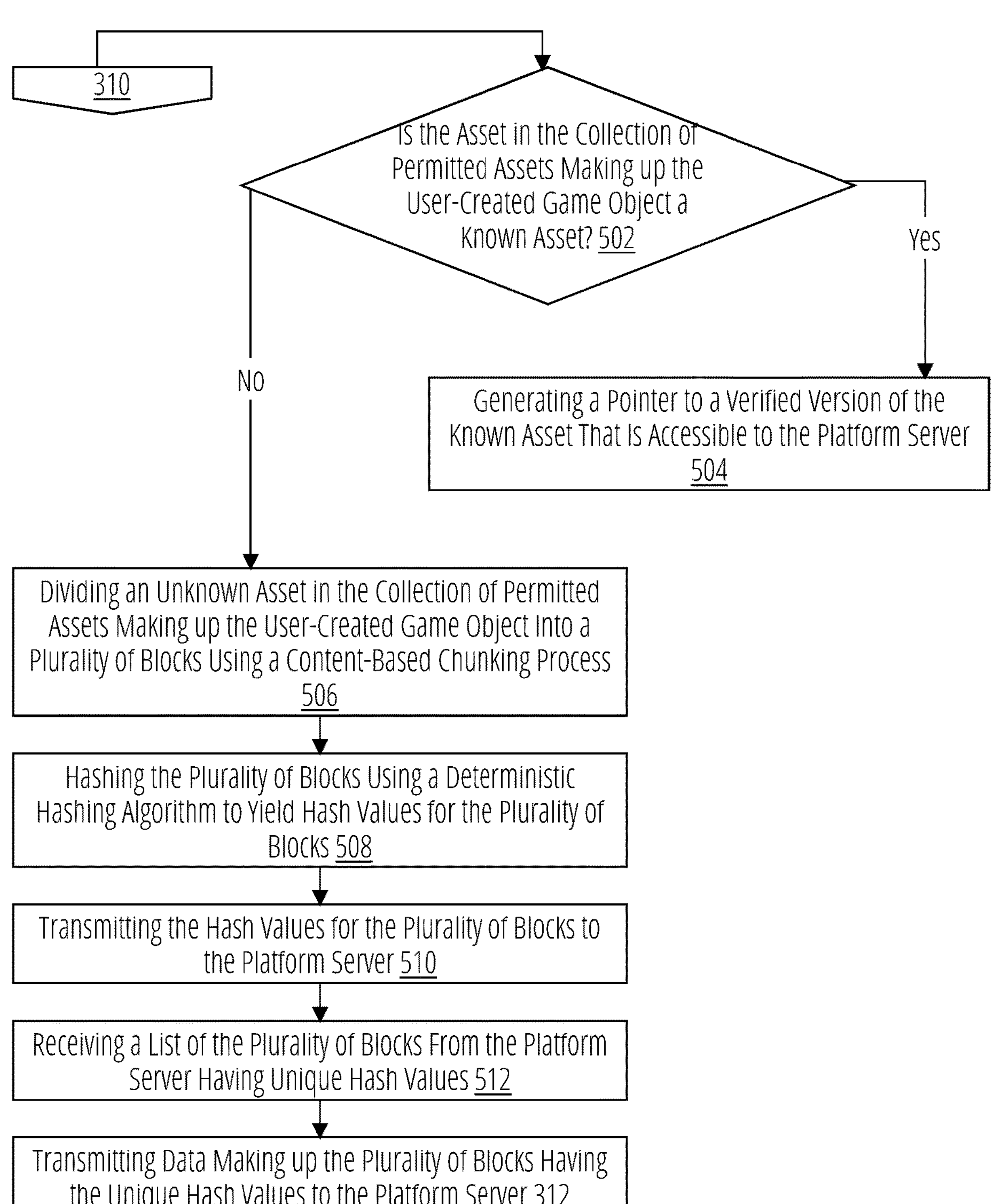
FIG. 5 illustrates an example routine for performing the deduplication process to avoid redundantly storing portions of assets in the collection of permitted assets making up the user-created game object in accordance with some aspects of the present technology.

FIG. 5 illustrates an example routine for performing the deduplication process to avoid redundantly storing portions of assets in the collection of permitted assets making up the user-created game object in accordance with some aspects of the present technology.

According to some examples, the method includes determining if the asset in the collection of permitted assets making up the user-created game object is a known asset at decision block 502. For example, a known asset can include one of assets provided by or recommended by the software development kit, assets provided by the game object editing environment, or assets in a list of permitted assets (even assets in the risky class of assets that are in the permitted list). As noted above, these known assets are already stored in the block database 208 of the platform server 148 or at the trusted public source 210 so there is no need to store these in duplicate. For these, known assets, the method includes generating a pointer to a verified version of the known asset that is accessible to the platform server at block 504. For example, the game object editing environment 204 illustrated in FIG. 2 may generate a pointer to a verified version of the known asset in the block database 208 of the platform server 148 or at the trusted public source 210.

For the assets that are unknown at decision block 502, the method includes dividing an unknown asset in the collection of permitted assets making up the user-created game object into a plurality of blocks using a content-based chunking process at block 506. For example, the game object editing environment 204 illustrated in FIG. 2 may divide an unknown asset in the collection of permitted assets making up the user-created game object into a plurality of blocks using a content-based chunking process. These unknown assets can be any assets in the tree of asset dependencies that are not of the risky class (since all of these assets are known if they are in the permitted list of risky assets). These assets can be completely custom assets.

The content-based chunking process can be a common technique for deterministically breaking files into blocks such that files with similar content have matching blocks. This process involves dividing the file into fixed-size or variable-size blocks based on the content of the file rather than arbitrary file boundaries. An example content-based chunking algorithm is Rabin-Karp chunking, which uses rolling hash functions to detect content variations. The content-based chunking process will detect changes in the content and mark those points as block boundaries. The blocks generally align similar content such that similar content for a similar asset type should often be broken into identical blocks.

According to some examples, the method includes hashing the plurality of blocks using a deterministic hashing algorithm to yield hash values for the plurality of blocks at block 508. For example, the game object editing environment 204 illustrated in FIG. 2 may hash the plurality of blocks using a deterministic hashing algorithm to yield hash values for the plurality of blocks.

According to some examples, the method includes transmitting the hash values for the plurality of blocks to the platform server at block 510. For example, the game object editing environment 204 illustrated in FIG. 2 may transmit the hash values for the plurality of blocks to the platform server to be compared against known hashes for already stored blocks.

According to some examples, the method includes receiving a list of the plurality of blocks from the platform server having hash values at block 512. For example, the game object editing environment 204 illustrated in FIG. 2 may receive a list of the plurality of blocks from the platform server having the hash values. Some of the blocks in the list of the plurality of blocks from the platform server have duplicate hash values along with addresses for where the blocks are stored. Some of the blocks in the list of the plurality of blocks can be indicated as being unique since they don't exist at the platform server 148.

According to some examples, the method includes transmitting data making up the plurality of blocks having unique hash values to the platform server at block 312. For example, the game object editing environment 204 illustrated in FIG. 2 may transmit data making up the plurality of blocks having the unique hash values to the platform server. Since these blocks hashed to unique values, this indicates that this content has not been previously stored at the block database 208 at the platform server 148. And since the content has not been previously stored, the blocks need to be transmitted from the game object editing environment 204 to the platform server 148.

The blocks that are transmitted to the platform server 148 can be blocks of the raw asset of the user-created game object so that the platform server 148 can have access to all of the raw assets of the user-created game object—at least the permitted assets of the user-created game object.

The platform server can generate a unique identifier for the user-created game object and can create a manifest for the user-created game object. The manifest can include a listing of all assets in the collection of permitted assets making up the user-created game object. The manifest can include an updated tree of asset dependencies that accounts for any assets that were in the user-created game object prior to the removal of prohibited assets. The manifest is used to identify and retrieve all of the collection of permitted assets making up the user-created game object from the block database 208 or trusted public source 210.

As addressed herein, the routines addressed in FIG. 3, FIG. 4, and FIG. 5 bring dual benefits. First, only safe and trusted assets are part of user-created game objects. Second, each unique block, containing unique content, is stored by the platform server 148. This results in substantial storage space savings since many user-created game object will have some overlapping portions, and new versions of existing user-created game objects will include substantial block overlap with the prior version of the user-created game object.

FIG. 6 illustrates an example routine for providing services on the raw assets of collection of permitted assets making up the user-created game object in accordance with some aspects of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

Once the raw assets are uploaded to the platform server 148, they need to be prepared for use on various client devices 106. For example, the platform server 148 will at least need to compile the raw assets into compiled assets. However, some distribution platforms have different capabilities and can have disparate requirements for assets within a game object that can be executed. Accordingly, the present technology can handle the optimization of game objects for execution in different distribution platforms.

When the platform server 148 is ready to prepare the raw assets of the user-created game object for distribution on at least one distribution platform, the platform server 148 can retrieve the manifest for the user-created game object by looking up the location of the manifest using the unique ID for the user-created game object, and can retrieve the collection of permitted assets making up the user-created game object from information about the assets in the manifest. For example, the manifest can also include unique IDs for each of the collection of permitted assets making up the user-created game object that can be used to look up the block list and location of the blocks making up the assets, or a location at a trusted public source 210 containing one of the assets.

According to some examples, the method includes evaluating the collection of permitted assets making up the user-created game object for compatibility with a particular distribution platform at block 602. For example, the platform server 148 illustrated in FIG. 1 may evaluate the collection of permitted assets making up the user-created game object for compatibility with a particular distribution platform.

In some examples, skilled game object creators might label some assets of their game objects as being optimized for high-performance environments such as a personal computer or a dedicated gaming platform, and label alternate versions of some assets as being optimized for less capable platforms such as mobile devices or some VR headsets. In such examples, the platform server 148 can recognize these tags in the evaluation.

In some examples, the platform server 148 can determine that some assets are allowed/not allowed on a particular distribution platform, or can determine that some assets will require more computing resources than are available on the particular distribution platform. The platform server can label these assets for exclusion or for needing optimization before compiling the user-created game object for the particular distribution platform.

According to some examples, the method includes modifying one or more assets in the collection of permitted assets making up the user-created game object for improved performance on the particular distribution platform to yield a modified asset at block 604. For example, the platform server 148 illustrated in FIG. 1 may modify one or more assets in the collection of permitted assets making up the user-created game object for improved performance on the particular distribution platform when the evaluation of the one or more assets indicated that the one or more assets were not optimized for the particular distribution platform. Some examples of asset modification can include removing certain features, reducing an amount of detail in textures or a number of shapes making up a user-created game object, using different materials or textures, or shaders or lighting that are simpler to render.

When the one or more assets are well enough optimized for the particular distribution platform, block 604 can be skipped.

According to some examples, the method includes performing at least one security check at block 606. For example, the platform server 148 illustrated in FIG. 1 may performing at least one security check. The security check can include checking the file structure against a specification and checking the manifest and the tree of asset dependencies to ensure the assets referenced by the manifest and the tree of asset dependencies are present and in the correct format. If an asset fails the security check, the platform server 148 can attempt to fix the error automatically or alert the user of the error in a dashboard.

After the assets of the user-created game object have been optimized and the security check has been passed, the method includes compiling the collection of permitted assets making up the user-created game object, including any modified asset, for distribution to the particular distribution platform at block 608. For example, the platform server 148 illustrated in FIG. 1 may compile the collection of permitted assets making up the user-created game object for distribution to the particular distribution platform. For example, the platform server 148 can compile the collection of permitted assets making up the user-created game object for a first particular distribution platform, and separately for a second particular distribution platform.

According to some examples, the method includes performing a runtime check of the compiled user-created game object by executing the user-created game object in a sandbox to validate the acceptable performance of the user-created game object at block 610. For example, the platform server 148 illustrated in FIG. 1 may perform a runtime check of the user-created game object to ensure the compiled user-created game object works as intended in a simulated runtime environment of the particular distribution platform.

Users may want to know the status of the processing of their user-created game objects. Therefore, the method includes providing a project dashboard listing the user-created game object as a project at block 612. For example, the platform server 148 illustrated in FIG. 1 may provide a project dashboard listing the user-created game object as a project. The dashboard 220 can provide a listing of a user accounts' user-created game objects. The user can select, and the dashboard 220 can receive a selection of the user-created game object listed in the project dashboard. As a result of the selection of the user-created game object, the dashboard 220 can display a status pertaining to the user-created game object. In some examples, the status can include a listing of prohibited assets that were removed from the tree of asset dependencies, a performance verification status indicating whether the user-created game object has finished a performance verification, a security verification status indicating whether the user-created game object has completed a security check, a particular distribution platform publication status indicating whether the user-created game object has been compiled for distribution on the particular distribution platform, etc.

FIG. 7 illustrates an example routine for updating a user-created game object to accommodate an updated distribution platform in accordance with some aspects of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

As addressed above, user-generated content is often not maintained as aspects of the object distribution platform evolve, or as the systems in which the user-generated content will eventually be executed are updated. For example, when the game engine, such as UNITY or UNREAL is updated, some aspects of game objects need to be updated to continue to function. Likewise, the distribution platforms also can receive updates that can require updates to the user-created game objects. To address these occurrences, the present technology can take advantage of access to the raw assets making up the user-created game objects to automatically keep the user-created game objects up to date.

According to some examples, the method includes determining that the particular distribution platform has received an update and is now an updated version of the particular distribution platform at block 702. For example, the platform server 148 illustrated in FIG. 1 may determine that the particular distribution platform has received an update and is now an updated version of the particular distribution platform.

In some examples, the user-created game object might already be compiled and distributed to distribution platforms. However, the present technology can work with the stored raw assets to modify them and then compiled an updated user-created game object. For example, the platform server 148 can determine that a complied user-created game object can be updated. The platform server 148 can again retrieve the manifest for the user-created game object by looking up the location of the manifest using the unique ID for the user-created game object, and can retrieve the collection of permitted assets making up the user-created game object from information about the assets in the manifest.

According to some examples, the method includes modifying one or more assets in the collection of permitted assets making up the user-created game object for improved performance on the updated version of the particular distribution platform to yield a modified asset at block 704. For example, the platform server 148 illustrated in FIG. 1 may modify one or more assets in the collection of permitted assets making up the user-created game object for improved performance on the updated version of the particular distribution platform or updated game engine, to yield a modified asset. This step can be similar to the method performed with respect to block 604.

After the one or more assets has be modified or updated, the 148 can repeat the methods described with respect to block 606.

According to some examples, the method includes compiling the collection of permitted assets making up the user-created game object, including any modified asset, for distribution to the updated version of the particular distribution platform at block 706. For example, the platform server 148 illustrated in FIG. 1 may again compile the collection of permitted assets making up the user-created game object, including any modified asset, for distribution to the updated version of the particular distribution platform. This step can be similar to the method performed with respect to block 608, and the method addressed at block 610 can also be repeated for the updated user-created game object.

Figure 8:
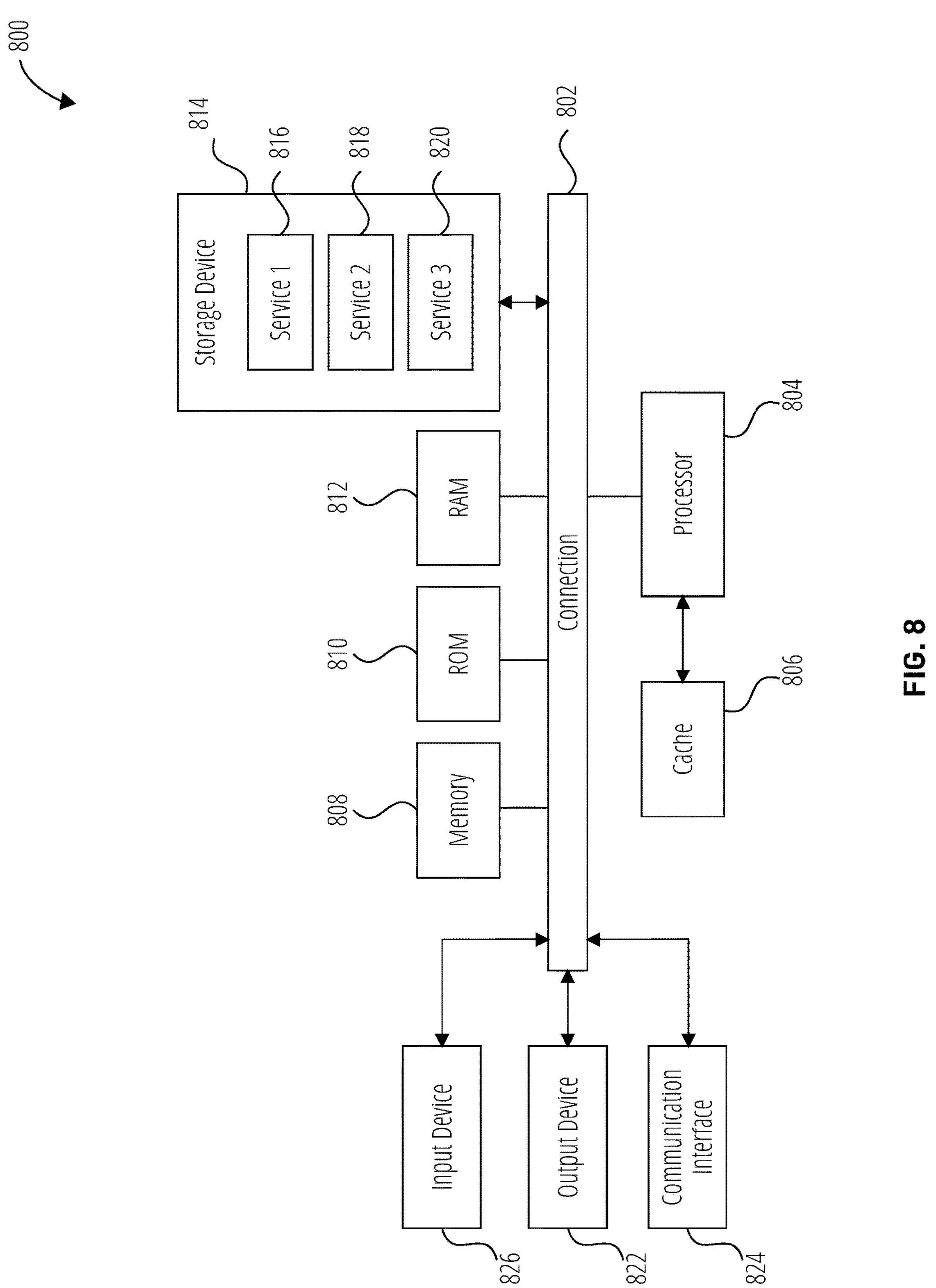
FIG. 8 shows an example of a system for implementing certain aspects of the present technology.

FIG. 8 shows an example of computing system 800, which can be for example any computing device making up client device 106, web services 110, game object editing environment 204, platform server 148, or any component thereof in which the components of the system are in communication with each other using connection 802. Connection 802 can be a physical connection via a bus, or a direct connection into processor 804, such as in a chipset architecture. Connection 802 can also be a virtual connection, networked connection, or logical connection.

In some embodiments, computing system 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 800 includes at least one processing unit (CPU or processor) 804 and connection 802 that couples various system components including system memory 808, such as read-only memory (ROM) 810 and random access memory (RAM) 812 to processor 804. Computing system 800 can include a cache of high-speed memory 806 connected directly with, in close proximity to, or integrated as part of processor 804.

Processor 804 can include any general purpose processor and a hardware service or software service, such as services 816, 818, and 820 stored in storage device 814, configured to control processor 804 as well as a special-purpose processor where software instructions are incorporated into the actual processor design. Processor 804 may essentially be a completely self-contained computing system, containing multiple cores or processors, a bus, memory controller, cache, etc. A multi-core processor may be symmetric or asymmetric.

To enable user interaction, computing system 800 includes an input device 826, which can represent any number of input mechanisms, such as a microphone for speech, a touch-sensitive screen for gesture or graphical input, keyboard, mouse, motion input, speech, etc. Computing system 800 can also include output device 822, which can be one or more of a number of output mechanisms known to those of skill in the art. In some instances, multimodal systems can enable a user to provide multiple types of input/output to communicate with computing system 800. Computing system 800 can include communication interface 824, which can generally govern and manage the user input and system output. There is no restriction on operating on any particular hardware arrangement, and therefore the basic features here may easily be substituted for improved hardware or firmware arrangements as they are developed.

Storage device 814 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 814 can include software services, servers, services, etc., that when the code that defines such software is executed by the processor 804, it causes the system to perform a function. In some embodiments, a hardware service that performs a particular function can include the software component stored in a computer-readable medium in connection with the necessary hardware components, such as processor 804, connection 802, output device 822, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

The present technology includes computer-readable storage mediums for storing instructions, and systems for executing any one of the methods embodied in the instructions addressed in the aspects of the present technology presented below:

Aspect 1. A method for managing a user-created game object to provide a secure and a predictable game performance, the method comprising: receiving, by a software development kit installed in a game object editing environment, a request to publish the user-created game object to a platform server for distribution; requesting, by the software development kit, a tree of asset dependencies from the game object editing environment, the tree of asset dependencies includes at least one asset and data descriptive of an appearance of the asset, a function of the asset, and/or a relationship of the asset to other assets making up the user-created game object; analyzing, by the software development kit, the tree of asset dependencies to identify prohibited assets; removing, by the software development kit, the prohibited assets from the tree of asset dependencies to yield a collection of permitted assets making up the user-created game object; performing, by the software development kit, a deduplication process to identify at least portions of the assets in the collection of permitted assets making up the user-created game object that already exist at the platform server; transmitting, by the software development kit, portions of the assets in the collection of permitted assets making up the user-created game object that does not already exist at the platform server to the platform server; evaluating, by the platform server, the collection of permitted assets making up the user-created game object for compatibility with a particular distribution platform; modifying, by the platform server, one or more assets in the collection of permitted assets making up the user-created game object for improved performance on the particular distribution platform to yield a modified asset, when the evaluation of the one or more assets indicated that the one or more assets were not optimized for the particular distribution platform; compiling, by the platform server, the collection of permitted assets making up the user-created game object, including any modified asset, for distribution to the particular distribution platform.

Aspect 2. The method of Aspect 1, wherein the analyzing the tree of asset dependencies to identify prohibited assets further includes: determining that the at least one asset in the tree of asset dependencies is in a risky asset when the risky asset belongs to a class of risky assets; determining that risky asset is in a permitted list, maintaining the risky asset in the permitted list in the tree of asset dependencies; determining that the risky asset is not in a permitted list or is in a prohibited list and classifying the risky asset as one of the prohibited assets.

Aspect 3. The method of any of Aspects 1 to 2, wherein the class of risky assets includes scripts.

Aspect 4. The method of any of Aspects 1 to 3, wherein the tree of asset dependencies includes at least one shape model, texture, shader, animation, audio asset, particle system, or script Aspect 5. The method of any of Aspects 1 to 4, wherein the deduplication process further comprises: identifying a known asset in the collection of permitted assets making up the user-created game object, wherein the known asset includes one of assets provided by the software development kit, assets provided by the game object editing environment, or assets in a list of permitted assets; generating a pointer to a verified version of the known asset that is accessible to the platform server; dividing an unknown asset in the collection of permitted assets making up the user-created game object into a plurality of blocks using a content-based chunking process; hashing the plurality of blocks using a deterministic hashing algorithm to yield hash values for the plurality of blocks; transmitting the hash values for the plurality of blocks to the platform server; receiving a list of the plurality of blocks from the platform server having unique hash values, and a list of the plurality of blocks from the platform server having duplicate hash values along with addresses for where content associated with the plurality of blocks having the duplicate hash values are stored; transmitting data making up the plurality of blocks having the unique hash values to the platform server.

Aspect 6. The method of any of Aspects 1 to 5, further comprising: providing a project dashboard listing the user-created game object as a project; receiving a selection of the user-created game object in the project dashboard; as a result of the selection of the user-created game object, displaying a status pertaining to the user-created game object, the status including: a listing of prohibited assets that were removed from the tree of asset dependencies, a performance verification status indicating whether the user-created game object has finished a performance verification, a security verification status indicating whether the user-created game object has completed a security check, a particular distribution platform publication status indicating whether the user-created game object has been compiled for distribution on the particular distribution platform.

Aspect 7. The method of any of Aspects 1 to 6, further comprising: prior to the compiling, performing at least one security check, the security check including at least one of: checking the file structure against a specification, checking a manifest and the tree of asset dependencies to ensure the assets referenced by the manifest and the tree of asset dependencies are present and in the correct format.

Aspect 8. The method of any of Aspects 1 to 7, further comprising: performing a runtime check of the user-created game object after compiling by executing user-created game object in a sandbox to validate acceptable performance of the user-created game object.

Aspect 9. The method of any of Aspects 1 to 8, further comprising: after the compiling the collection of permitted assets making up the user-created game object for distribution to the particular distribution platform, determining that the particular distribution platform has received an update and is now an updated version of the particular distribution platform; modifying, by the platform server, one or more assets in the collection of permitted assets making up the user-created game object for improved performance on the updated version of the particular distribution platform to yield a modified asset; and again compiling, by the platform server, the collection of permitted assets making up the user-created game object, including any modified asset, for distribution to the updated version of the particular distribution platform.

What is claimed is:

1. A method comprising:

requesting a tree of asset dependencies from a game object editing environment for a user-created game object;

analyzing, the tree of asset dependencies to identify prohibited assets;

removing the prohibited assets from the tree of asset dependencies to yield a collection of permitted assets making up the user-created game object;

evaluating the collection of permitted assets making up the user-created game object for compatibility with a particular distribution platform;

performing a deduplication process to identify at least portions of the assets in the collection of permitted assets making up the user-created game object that already exist at a platform server;

transmitting portions of the assets in the collection of permitted assets making up the user-created game object that does not already exist at the platform server to the platform server; and compiling the collection of permitted assets making up the user-created game object for distribution to the particular distribution platform.

2. The method of claim 1, further comprising:

generating a unique identifier for the user-created game object; and creating a manifest for the user-created game object, the manifest including a listing collection of permitted assets making up the user-created game object.

3. The method of claim 1, wherein the analyzing the tree of asset dependencies to identify the prohibited assets further includes:

determining that at least one asset in the tree of asset dependencies is in a risky asset when the risky asset belongs to a class of risky assets;

determining that risky asset is in a permitted list, maintaining the risky asset in the permitted list in the tree of asset dependencies;

determining that the risky asset is not in the permitted list or is in a prohibited list and classifying the risky asset as one of the prohibited assets.

4. The method of claim 1, further comprising:

modifying one or more assets in the collection of permitted assets making up the user-created game object for improved performance on the particular distribution platform to yield a modified asset.

5. The method of claim 4, further comprising:

prior to the compiling, performing at least one security check, the at least one security check including at least one of checking a file structure against a specification, checking a manifest and the tree of asset dependencies to ensure the assets referenced by the manifest and the tree of asset dependencies are present and in the correct format.

6. The method of claim 4, further comprising:

performing a runtime check of the user-created game object after the compiling by executing the user-created game object in a sandbox to validate an acceptable performance of the user-created game object.

7. The method of claim 4, further comprising:

after the compiling the collection of permitted assets making up the user-created game object for distribution to the particular distribution platform, determining that the particular distribution platform has received an update and is now an updated version of the particular distribution platform;

retrieving the collection of permitted assets making up the user-created game object using the manifest for the user-created game object;

modifying one or more assets in the collection of permitted assets making up the user-created game object for improved performance on the updated version of the particular distribution platform to yield a modified asset; and again compiling the collection of permitted assets making up the user-created game object for distribution to the updated version of the particular distribution platform.

8. The method of claim 1, wherein the deduplication process further comprises:

identifying a known asset in the collection of permitted assets making up the user-created game object;

generating a pointer to a verified version of the known asset that is accessible to the platform server;

dividing an unknown asset in the collection of permitted assets making up the user-created game object into a plurality of blocks;

hashing the plurality of blocks using a deterministic hashing algorithm to yield hash values for the plurality of blocks;

transmitting the hash values for the plurality of blocks to the platform server;

receiving a list of the plurality of blocks from the platform server having unique hash values; and transmitting data making up the plurality of blocks having the unique hash values to the platform server.

9. A computing system comprising:

a processor; and a memory storing instructions that, when executed by the processor, configure the system to:

request a tree of asset dependencies from a game object editing environment for a user-created game object;

analyze, the tree of asset dependencies to identify prohibited assets;

remove the prohibited assets from the tree of asset dependencies to yield a collection of permitted assets making up the user-created game object;

evaluate the collection of permitted assets making up the user-created game object for compatibility with a particular distribution platform;

perform a deduplication process to identify at least portions of the assets in the collection of permitted assets making up the user-created game object that already exist at a platform server;

transmit portions of the assets in the collection of permitted assets making up the user-created game object that does not already exist at the platform server to the platform server; and compile the collection of permitted assets making up the user-created game object for distribution to the particular distribution platform.

10. The computing system of claim 9, wherein the analyzing the tree of asset dependencies to identify the prohibited assets further includes:

determine that at least one asset in the tree of asset dependencies is in a risky asset when the risky asset belongs to a class of risky assets;

determine that risky asset is in a permitted list, maintaining the risky asset in the permitted list in the tree of asset dependencies;

determine that the risky asset is not in the permitted list or is in a prohibited list and classifying the risky asset as one of the prohibited assets.

11. The computing system of claim 9, wherein the instructions further configure the system to:

modify one or more assets in the collection of permitted assets making up the user-created game object for improved performance on the particular distribution platform to yield a modified asset.

12. The computing system of claim 11, wherein the instructions further configure the system to:

prior to the compiling, perform at least one security check, the at least one security check including at least one of checking a file structure against a specification, checking a manifest and the tree of asset dependencies to ensure the assets referenced by the manifest and the tree of asset dependencies are present and in the correct format.

13. The computing system of claim 11, wherein the instructions further configure the system to:

perform a runtime check of the user-created game object after the compiling by executing the user-created game object in a sandbox to validate an acceptable performance of the user-created game object.

14. The computing system of claim 11, wherein the instructions further configure the system to:

after the compiling the collection of permitted assets making up the user-created game object for distribution to the particular distribution platform, determining that the particular distribution platform has received an update and is now an updated version of the particular distribution platform;

retrieve the collection of permitted assets making up the user-created game object using a manifest for the user-created game object, the manifest including a listing collection of permitted assets making up the user-created game object;

modify one or more assets in the collection of permitted assets making up the user-created game object for improved performance on the updated version of the particular distribution platform to yield a modified asset; and again compile the collection of permitted assets making up the user-created game object for distribution to the updated version of the particular distribution platform.

15. The computing system of claim 9, wherein the deduplication process further comprises:

identify a known asset in the collection of permitted assets making up the user-created game object;

generate a pointer to a verified version of the known asset that is accessible to the platform server;

divide an unknown asset in the collection of permitted assets making up the user-created game object into a plurality of blocks;

hash the plurality of blocks using a deterministic hashing algorithm to yield hash values for the plurality of blocks;

transmit the hash values for the plurality of blocks to the platform server;

receive a list of the plurality of blocks from the platform server having unique hash values; and transmit data making up the plurality of blocks having the unique hash values to the platform server.

16. A non-transitory computer-readable storage medium, the computer-readable storage medium including instructions that configure the at least one processor to:

request a tree of asset dependencies from a game object editing environment for a user-created game object;

analyze, the tree of asset dependencies to identify prohibited assets;

remove the prohibited assets from the tree of asset dependencies to yield a collection of permitted assets making up the user-created game object;

evaluate the collection of permitted assets making up the user-created game object for compatibility with a particular distribution platform;

perform a deduplication process to identify at least portions of the assets in the collection of permitted assets making up the user-created game object that already exist at a platform server;

transmit portions of the assets in the collection of permitted assets making up the user-created game object that does not already exist at the platform server to the platform server; and compile the collection of permitted assets making up the user-created game object for distribution to the particular distribution platform.

17. The computer-readable storage medium of claim 16, wherein the analyzing the tree of asset dependencies to identify the prohibited assets further includes:

determine that at least one asset in the tree of asset dependencies is in a risky asset when the risky asset belongs to a class of risky assets;

determine that risky asset is in a permitted list, maintaining the risky asset in the permitted list in the tree of asset dependencies;

determine that the risky asset is not in the permitted list or is in a prohibited list and classifying the risky asset as one of the prohibited assets.

18. The computer-readable storage medium of claim 16, wherein the instructions further configure the at least one processor to:

modify one or more assets in the collection of permitted assets making up the user-created game object for improved performance on the particular distribution platform to yield a modified asset.

19. The computer-readable storage medium of claim 18, wherein the instructions further configure the at least one processor to:

prior to the compiling, perform at least one security check, the at least one security check including at least one of checking a file structure against a specification, checking a manifest and the tree of asset dependencies to ensure the assets referenced by the manifest and the tree of asset dependencies are present and in the correct format.

20. The computer-readable storage medium of claim 18, wherein the instructions further configure the at least one processor to:

after the compiling the collection of permitted assets making up the user-created game object for distribution to the particular distribution platform, determining that the particular distribution platform has received an update and is now an updated version of the particular distribution platform;

retrieve the collection of permitted assets making up the user-created game object using a manifest for the user-created game object, the manifest including a listing collection of permitted assets making up the user-created game object;

modify one or more assets in the collection of permitted assets making up the user-created game object for improved performance on the updated version of the particular distribution platform to yield a modified asset; and again compile the collection of permitted assets making up the user-created game object for distribution to the updated version of the particular distribution platform.

21. The computer-readable storage medium of claim 16, wherein the deduplication process further comprises:

identify a known asset in the collection of permitted assets making up the user-created game object;

generate a pointer to a verified version of the known asset that is accessible to the platform server;

divide an unknown asset in the collection of permitted assets making up the user-created game object into a plurality of blocks;

hash the plurality of blocks using a deterministic hashing algorithm to yield hash values for the plurality of blocks;

transmit the hash values for the plurality of blocks to the platform server;

receive a list of the plurality of blocks from the platform server having unique hash values; and transmit data making up the plurality of blocks having the unique hash values to the platform server.

* * * * *